(12) United States Patent
Cohen et al.

(10) Patent No.: US 7,328,726 B2
(45) Date of Patent: Feb. 12, 2008

(54) RAMP RATE BLENDER

(75) Inventors: Joseph Perry Cohen, Bethlehem, PA (US); Edward Clyde Heydorn, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 183 days.

(21) Appl. No.: 11/336,218

(22) Filed: Jan. 20, 2006

(65) Prior Publication Data

US 2007/0169837 A1 Jul. 26, 2007

(51) Int. Cl.
*B65B 1/04* (2006.01)

(52) U.S. Cl. .............. 141/9; 141/83; 141/94; 141/104; 141/105; 222/26; 222/145.1

(58) Field of Classification Search .......... 141/1, 141/2, 9, 82, 83, 94, 104, 105; 222/25, 26, 222/145.1
See application file for complete search history.

(56) References Cited

U.S. PATENT DOCUMENTS

| | | | |
|---|---|---|---|
| 5,139,002 A | 8/1992 | Lynch et al. | |
| 5,771,948 A | 6/1998 | Kountz et al. | |
| 5,979,705 A * | 11/1999 | Kaehler et al. | 222/71 |
| 6,223,788 B1 * | 5/2001 | Taylor | 141/9 |
| 6,810,925 B2 * | 11/2004 | Graham et al. | 141/98 |
| 7,032,629 B1 * | 4/2006 | Mattingly et al. | 141/9 |
| 7,168,464 B2 * | 1/2007 | Diggins | 141/105 |

OTHER PUBLICATIONS

U.S. Appl. No. 11/247,561, filed Oct. 10, 2005, Cohen et al.

* cited by examiner

*Primary Examiner*—Timothy L. Maust
(74) *Attorney, Agent, or Firm*—Keith D. Gourley

(57) ABSTRACT

The invention provides processes for delivering a blend of two or more compressed gas streams to a receiving vessel at a preset ramp rate under pressure regulation control in response to cumulative mass ratio when at least two of the streams have different compositions or instantaneous measured temperature when the streams have the same composition.

20 Claims, 6 Drawing Sheets

Example of Fill using Single Compressed Gas Source at Ramp = 5 MPa per Minute

Caculated Example of Fill using Novel Fill System for Two Compressed Gas Sources to Achieve Mass Ratio of Hydrogen in CNG = 6% at Ramp Ramp = 5 MPa per Minute Caculated Response of Novel Fill System for Two Compressed Gas Sources at
Ramp Rate = 5 MPa per Minute Example of Single Component Fill from Sources at Two Different Temperatures at Ramp Ramp = 5 MPa per Minute Calculated Response of Novel Fill System for Two Compressed Gas Sources at Different Temperatures at Ramp Rate = 5 MPa per Minute

RAMP RATE BLENDER

BACKGROUND OF THE INVENTION

The "Hydrogen Economy" is expected to grow continuously and hydrogen may eventually supplant fossil fuels as a primary energy source for many applications. Numerous hydrogen applications are being developed, including hydrogen-powered fuel cell or internal combustion vehicles, stationary power applications, backup power units, power grid management, power for remote locations, and portable power applications in consumer electronics, business machinery, and recreational equipment. A significant expansion of the Hydrogen Economy will require marked improvements in existing hydrogen delivery systems. Adapting these systems to deliver blends of hydrogen and other compressed gases can be particularly problematic.

When filling a receiving tank with one or more compressed gas streams, the compressed gas streams' flow rates must be controlled and the streams must be well-mixed to prevent the receiving tank from overheating. For example, rapid refueling of a receiving tank with a hydrogen gas stream can cause the internal gas temperature of a receiving tank to rise by about 50° C. due to adiabatic compression of the hydrogen gas stream and the reverse Joule-Thompson (J-T) effect. (Hydrogen and helium are exceptions to the rule that temperature decreases with expansion of the gas, i.e., they exhibit a reverse Joule-Thompson (J-T) effect.)

Overheating is still a concern even though the heat of compression is partially offset by isentropic expansion and resultant cooling within the storage vessel, and proves to be a greater risk with larger tanks.

U.S. Pat. No. 6,786,245 discloses an apparatus and method for controlling the rate of delivery of a pressurized fluid from a storage vessel to a receiving tank through a conduit in fluid communication with the storage vessel and the receiving tank.

U.S. Pat. No. 5,139,002 ('002 Patent) discloses the use of blends of hydrogen and natural gas as vehicular fuels. The '002 Patent also discloses the simultaneous flow of two compressed gas streams through a common gas fitting on a horizontal storage cylinder useful in transportation applications.

U.S. Pat. No. 5,771,948 ('948 Patent) discloses methods and apparatus for dispensing natural gas into the natural gas vehicle cylinder of a motor vehicle. The '948 Patent discloses that changes in the mass of a compressed natural gas stream can be correlated as a function of initial cylinder pressure.

Commonly-owned U.S. patent application Ser. No. 11/247,561 describes systems and processes in which the flow rate of compressed gas from a source to a receiving vessel or tank is controlled to achieve a desired ramp rate.

Individual gaseous stream control valves have been used to provide pre-blending flow control in processes in which two or more gas streams are blended and delivered to a receiving vessel. Alternatively, a control valve has been associated with one component stream and a restricted flow has been imposed on the secondary stream. These approaches suffer from the disadvantage that high pressure control valves are expensive, relatively uncommon, and are often unrated for use with flammable gases.

Accordingly, the need exists for processes and systems that deliver blends of compressed gases to a receiving tank or vessel without causing an unacceptable increase in vessel or tank temperature and without the need for a prolonged fill times.

BRIEF SUMMARY OF THE INVENTION

In one embodiment, the invention provides a process for delivering a blend of two or more compressed gas streams to a receiving vessel, the process comprising:
(a) blending two or more compressed gas streams to form the blend, wherein each of the two or more compressed gas streams (1) is supplied by a separate compressed gas supply source, (2) is under the control of one or more pressure regulators, and (3) is subject to mass flow rate measurement by one or more flow detectors; and
(b) delivering the blend to the receiving vessel at a preset blend ramp rate, wherein
(I) a programmable controller (1) receives data from the one or more flow detectors representing the mass flow rates for at least two of the two or more compressed gas streams (2) calculates a cumulative mass ratio for the blend based on the mass flow rates of at least two of the two or more compressed gas streams, and (3) (i) compares the calculated cumulative mass ratio for the blend to a pre-set blend cumulative mass ratio, and (ii) adjusts the pressure regulator for at least one of the two or more compressed gas streams as necessary to maintain the calculated cumulative mass ratio for the blend within a specified tolerance of the pre-set blend cumulative mass ratio; and
(II) at least two of the two or more compressed gas streams have different compositions.

"Ramp rate" is defined as pressure increase per unit time in the receiving vessel.

The preset ramp rate for delivery of the two or more compressed gases to the receiving vessel is determined by the desired increase in pressure in the receiving vessel; the preset ramp rate can be reduced so that the temperature within the receiving vessel does not exceed the design temperature of the vessel (for example, during periods with elevated ambient temperatures).

In a preferred embodiment of a process of the invention, a blend consisting of compressed hydrogen and natural gas is delivered to a receiving vessel and a programmable logic controller varies the output of the pressure regulator that controls the pressure of one of the compressed gas streams (for example, the hydrogen gas stream).

In another preferred embodiment of a process of the invention which delivers a blend consisting of compressed hydrogen and natural gas, each compressed gas stream's pressure regulator includes a current to pressure transducer which receives a signal transmitted by a programmable logic controller and which varies the output of one of the pressure regulators (for example, the pressure regulator that controls the pressure of the hydrogen stream).

In still another preferred embodiment, a process of the invention delivers a blend consisting of compressed hydrogen and natural gas: the blend contains about 5% to about 50% by volume of hydrogen (about 0.6% to about 11% by mass of hydrogen), the balance of the blend consists essentially of compressed natural gas (CNG), and the maximum receiving vessel pressure is around 25 megapascals (MPa) to around 35 MPa.

In still another preferred embodiment, a process of the invention delivers a blend consisting of compressed hydrogen and natural gas and during delivery of the blend of compressed hydrogen and natural gas to the receiving vessel, the receiving vessel temperature does not increase by more than about 50° C. Preferably, the temperature of the receiving vessel is maintained below a maximum temperature, for example, 85° C.

In still another preferred embodiment, a process of the invention delivers a blend consisting of compressed hydrogen and natural gas, the blend contains about 5% to about 50% by volume of hydrogen (about 0.6% to about 11% by mass of hydrogen), the balance of the blend consists essentially of compressed natural gas, the maximum receiving vessel pressure is around 35 MPa, the blend ramp rate is around five to fifteen MPa per minute, and the temperature of the receiving vessel is maintained below a maximum value, for example, 85° C.

In still another preferred embodiment of a process of the invention, the receiving vessel is located at a compressed gas station for fueling vehicles.

In still another embodiment, the invention provides a process for delivering a blend of two or more compressed gases to a receiving vessel, the process comprising:
(a) blending two or more compressed gas streams to form the blend, wherein each of the two or more compressed gas streams (1) is supplied by a separate compressed gas supply source, (2) is under the control of one or more pressure regulators, (3) is subject to temperature measurement by one or more temperature sensors, (4) has essentially the same composition; and
(b) delivering the blend to the receiving vessel at a preset blend ramp rate, wherein a programmable controller (1) receives data from the one or more temperature sensors representing the temperatures of at least two of the two or more compressed gas streams (2) calculates an instantaneous ramp rate for at least one of the compressed gas streams based on the temperatures of at least two of the two or more compressed gas streams, and (3) (i) compares an instantaneous measured temperature of the blend to a pre-set target temperature of the blend, and (ii) adjusts the pressure regulator for at least one of the two or more compressed gas streams as necessary to maintain the instantaneous measured temperature within a specified tolerance.

An instantaneous ramp rate for at least one of the compressed gas streams is calculated from the temperatures of at least two of the two or more compressed gas streams by feedback of the difference between the actual and desired temperature.

Processes of the invention deliver blends of compressed gases to a receiving vessel without causing an unacceptable increase in vessel temperature, without the need for a prolonged fill times, and without the need for high pressure control valves. For example, by using processes and systems of the invention, a clean burning gaseous fuel, e.g., of a blend of hydrogen and compressed natural gas, can be delivered to a vehicular receiving tank in a cost-effective manner and with good control of pressure, temperature, and the blend of the compressed gas streams.

Since excessive gas cooling can also affect a receiving tank adversely, the blend ramp rate can be adjusted using processes of the invention to maintain the temperature above a minimum allowable value. Further, the invention enables the delivery of a blend of two different gas streams to a receiving vessel without costly and unreliable mechanical compression.

These and other features of the invention are described further in the following written description.

DETAILED DESCRIPTION OF THE INVENTION

Figure 1:
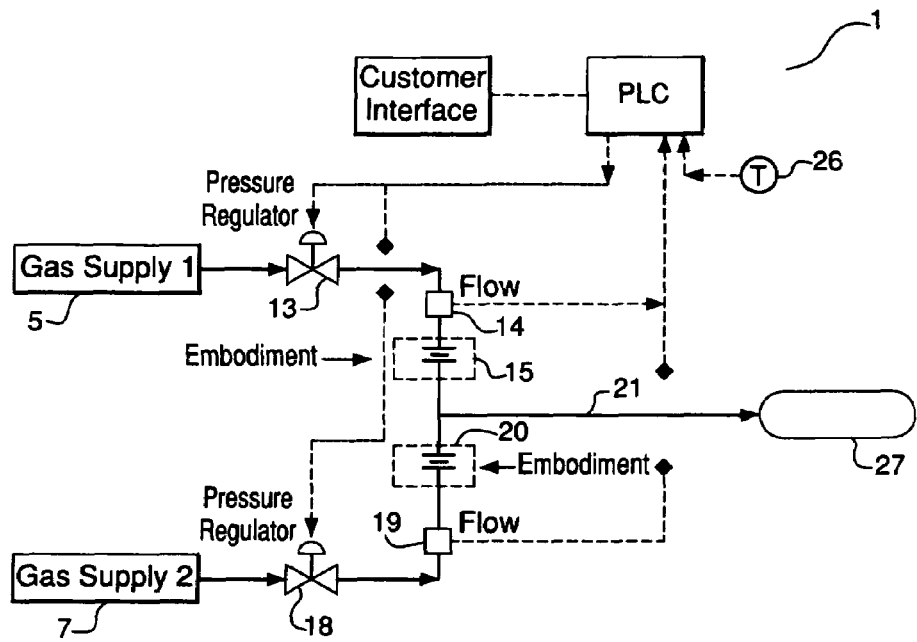
FIG. 1 is a process flow diagram for an embodiment of the instant invention in which two compressed gas streams are blended and delivered to a receiving vessel.

The following definitions apply unless indicated otherwise. "A blend of two or more compressed gas streams" includes but is not limited to a compressed gas stream formed by the combination of two or more compressed gases that may optionally be obtained from two or more separate sources of compressed gas, at least one of which may be a liquefied gas source. A preferred blend of two or more compressed gas streams comprises compressed natural gas and hydrogen wherein the hydrogen comprises at least about 5% to about 50% by volume of hydrogen (about 0.6% to about 11% by mass of hydrogen) and the balance of the blend consists essentially of natural gas. The pre-blend temperatures and ramp rates of the compressed gas streams can be the same or different.

"Receiving vessels" or "storage tanks" include pressurized tanks and compressed gas storage vessels that are well-known to those of ordinary skill in the art and that are configured for the controlled receipt of blends of compressed gas, as described herein. Preferably, a pressure buildup system is associated with the receiving vessel or storage tank. A receiving vessel or storage tank can be located at a hydrogen fueling station, including but not limited to a hydrogen fuel station for vehicles, e.g., as described in U.S. Pat. No. 6,810,925. Receiving vessels and storage tanks also include vehicle fuel storage tanks.

In a purely illustrative example, automatic filling of a vehicle tank with a blend of compressed gases in accordance with the invention can involve the use of PLC-controlled interlocked solenoid operated valves.

"Ramp rate" has been defined previously.

"Cumulative mass ratio" is defined as the cumulative quantity (in units of mass) of one compressed gas stream divided by the sum of the cumulative quantities (all in units of mass) of all compressed gas streams being supplied to a receiving vessel.

"A pre-set blend cumulative mass ratio" can be determined from the volumetric blend ratio (i.e. the volume of one of the compressed gas streams in the blend of two or more compressed gas streams relative to the total volume of the blend of two or more compressed gas streams) through calculations that are well-known to those of ordinary skill in the art. The relationship between mass and volume (or density) of compressed gases can be calculated in its simplest form using the ideal-gas equation:

$$P*V=Z*n*R*T$$

where P is the pressure of the compressed gas, V is the volume of the compressed gas, n is the number of moles of the compressed gas, Z is the compressibility factor, R is the ideal gas constant corresponding to the units for pressure, volume, number of moles, and temperature, and T is the temperature of the compressed gas. Density ($\rho$) can then be calculated using the following equation:

$$\rho=P*MW/(Z*R*T)$$

where MW is the molecular weight of the component in the compressed gas. Since the values for pressure, temperature, and the ideal gas constant are the same for all components in a compressed gas blend, the pre-set cumulative mass ratio MR (units of percent) can be calculated from the volume ratio VR (units of percent) for component 1 of the blend using the following equation:

$$MR_1 = (VR_1*MW_1/Z_1) \bigg/ \sum_{i=1}^{n}(VR_i*MW_i/Z_i),$$

where n represents the total number of components in the blend. The equation is repeated for all other components 2 through n in the blend.

"A preset blend ramp rate" is the desired pressure increase per unit time during the receiving vessel fill cycle. The desired ramp rate directly relates to the desired fill rate and falls within an acceptable tolerance, based on factors such as the structural integrity and temperature limits of the receiving tank. In a preferred embodiment of a process of the invention which delivers a blend consisting of compressed hydrogen and natural gas, the blend contains about 5% to about 50% by volume of hydrogen (about 0.6% to about 11% by mass of hydrogen), the balance of the blend consists essentially of compressed natural gas, the maximum receiving vessel pressure is around 35 MPa, and the blend ramp rate is around five to around fifteen MPa per minute.

Maintaining the calculated cumulative mass ratio for the blend within a specified tolerance of the pre-set blend cumulative mass ratio means maintaining the calculated cumulative mass ratio for the blend within about 0.1% to about 5% of the pre-set blend cumulative mass ratio, more preferably within about 0.5% of the pre-set blend cumulative mass ratio.

Maintaining the instantaneous measured blend ramp rate within a specified tolerance of the pre-set blend ramp rate means maintaining the measured blend ramp rate within about +/−1 MPa per minute of the pre-set blend ramp rate.

The ramp rate is selected to avoid overheating the tank. The mass ratio is selected based on the requirements of the vehicle that will be using the fuel.

An instantaneous ramp rate for at least one of the compressed gas streams can be calculated based on many different sources. In one example, the ramp rate is a function of ambient temperature. For example, if the ambient temperature is less than around 15° C., then the ramp rate will be set to around 12 MPa per minute; if the ambient temperature is greater than around 30° C., then the ramp rate will be set to around 6 MPa per minute; and at an intermediate ambient temperature, the ramp rate will be set to around 9 MPa per minute.

A pre-set target temperature for the blend is determined by the desired conditions in the receiving vessel during the fill process; for example, a pre-set target temperature for the blend can be selected at a point (for instance, 30° F.) so that the maximum mass of compressed gas can be filled within the design temperature limits of the receiving vessel.

For example, the pre-set blend ramp rate in a temperature controlling blender correlates to a desired amount of time to fill a vehicle tank. For example, if it is desired to fill a 35 MPa vehicle in less than 2 minutes, then the pre-set ramp rate can be set to 17.4 MPa per minute.

Well-known infrastructure (e.g., piping, valves, and control devices) can be used to interconnect and configure the compressed gas stream supply sources, programmable logic control, receiving vessel, pressure regulators, flow detectors, and temperature sensors for the controlled blending and transmission of two or more compressed gas streams to the receiving vessel. For example, "a conduit system" can include conventional piping, valves, and control devices.

One of the "two or more separate sources of compressed gas" can include a pipeline hydrogen distribution system which transmits a purified hydrogen-containing product gas from hydrogen production facilities to a variety of types of hydrogen consumers (including stationary (e.g., residential and industrial) consumers and vehicular consumers (e.g., operators of FCV's, planes, or ships) through a network of interconnected pipelines and compressors, and if necessary, hydrogen-containing product gas storage and/or purification facilities.

One of the "two or more separate sources of compressed gas" can include a natural gas pipeline distribution network or an industrial hydrocarbon feedstock source, e.g., multiple hydrocarbon feedstock-containing refinery off gases or hydrocarbon feedstock-containing off gases from other processes. In one embodiment, a source of compressed gas includes a high pressure natural gas main coupled to a lower pressure service conduit by way of a natural gas regulator.

In a purely illustrative example, a receiving conduit can communicate with a source of compressed gas with a plurality of gas transmission lines that are in parallel with each other. A delivery conduit communicates with a vessel intended to receive compressed gas and also with the plurality of gas transmission lines. A control valve in each of a plurality of the gas transmission lines upstream of the delivery conduit connects those gas transmission lines with the delivery conduit when the valve is opened. At least some of the gas transmission lines have differing orifice coefficients for transmitting gas at different flow rates.

"Programmable controllers" are well-known to those of ordinary skill in the art and receive process inputs and adjust process parameters based on such inputs. Programmable controllers include but are not limited to electronic programmable logic controllers (PLC's), industrial personal computers, and programmable pneumatic or hydraulic controllers.

Programmable logic controllers include but are not limited to the Horner OCS (General Electric Corporation, CIMTEC Automation & Control 3030 Whitehall Park Drive Charlotte, N.C. 28273), Siemens S7-200 Micro-PLC (Siemens Corporation Citicorp Center 153 East 53rd Street New York, N.Y. 10022-4611) or the GE Fanuc 9030 (GE Fanuc Automation). Other useful programmable logic controllers include computer systems comprising central processing units (CPU's) for processing data, associated memory media including floppy disks or compact discs (CD's) which may store program instructions for CPU's, one or more display devices such as monitors, one or more alphanumeric input devices such as a keyboard, and one or more directional input devices such as a mouse.

Computer systems used as programmable logic controls can include a computational system memory such as DRAM, SRAM, EDO DRAM, SDRAM, DDR SDRAM, or Rambus RAM, or a non-volatile memory such as a magnetic media (e.g., a hard drive) or optical storage. The memory medium preferably stores a software program or programs for event-triggered transaction processing. The software program(s) may be implemented in any of various ways, including procedure-based techniques, component-based techniques, and/or object-oriented techniques, among others.

Programmable controllers (e.g., PLC's) can, through hardwire or wireless transmission techniques that are well-known to those of ordinary skill in the art, receive data from pressure regulators, flow detectors, temperature sensors, or customer interfaces in order to implement the control procedures described herein.

"Pressure regulators" can include well-known pressure regulators such as a Coriolis pressure regulator sold by Emerson Process Management (Brooks Instrument 407 West Vine Street Hatfield, Pa. 19440-0903) or any number of other commercially-available pressure regulators that are well-known to those of ordinary skill in the art. Dome-loaded pressure regulators are preferred pressure regulators.

"Flow detectors" can include any mass flow sensor such as a Coriolis flow meter, or a hot wire anemometer, or a volume flow meter such as a turbine meter, that uses pressure and or temperature compensation to calculate volume flow. Well known Coriolis flow meters include the CMF0010 and DH038 sold by Emerson Process Management (Micro Motion Inc, Winchester Circle, Boulder, Colo. 80301

"Temperature sensors" can include thermocouples, thermistors and RTD's for example an NBS Dual K T/C ½ NPT, 2.5" Imersion length Model# 6C-K-D-86-8-G-2.5"-W-SD27-Z which is sold by MultiMeasurments, Inc, 1 Madison Avenue, Suite 06, Warminster, Pa., 18974.

In a preferred embodiment, a Coriolis flow meter is configured to receive a flow signal which is transmitted to a PLC. The PLC will generate an electric current and to transmit that current to a current pressure transducer, which translates the current to a pressure which is applied the control side of a dome loaded pressure regulator. It is postulated that in such a system, there is a linear relationship between current and pressure in the receiving vessel and that a 4 milliamp signal from the PLC will increase the receiving vessel pressure until it is at least 0 psi in the process stream, a 20 milliamp signal from the PLC will increase the receiving vessel pressure until it is at least around 7,000 psi as long as a sufficient supply pressure is provided.

FIG. 1 illustrates a process flow diagram for a purely illustrative compressed gas delivery system 1 used in the invention that comprises two compressed gas supplies. Compressed gases 5 and 7 in gas supplies 1 and 2 have different compositions and the same or different temperatures. The pressure of each compressed gas stream is regulated by pressure regulators 13 and 18; the mass flow rate of each compressed gas stream is measured by flow rate detectors 14 and 19. The pressure ramp rate of each compressed gas stream is controlled by a programmable logic controller which is in communication with customer interface. The customer interface can comprise a CRT and keyboard or other equivalent device and is used to input information, for example, the pressure, temperature, and volume of the receiving vessel and the desired ramp rate (the latter can also be pre-programmed into the PLC). In one embodiment, the pressure of each compressed gas stream can be further reduced by restrictive orifices 15 and 20. Temperature sensor 26 measures the ambient temperature at the receiving tank 27.

The programmable logic controller in FIG. 1 is in communication with flow detectors 14 and 19 for the receipt and analysis of data representing the mass flow rates of compressed gases 5 and 7 and converts the mass flow rates of compressed gases 5 and 7 to the calculated cumulative mass of each compressed gas stream being supplied to the receiving tank. The programmable logic controller compares the calculated cumulative mass of each compressed gas stream 5 and 7 to its respective desired value. The programmable logic controller is in communication with and adjusts one of the pressure regulators, in this case, pressure regulator 13, as necessary to achieve the desired blend of hydrogen and natural gas in stream 21. The blend ramp rate of stream 21 is determined by the difference in pressure between the initial and maximum allowable pressure of receiving vessel 27.

Figure 2:
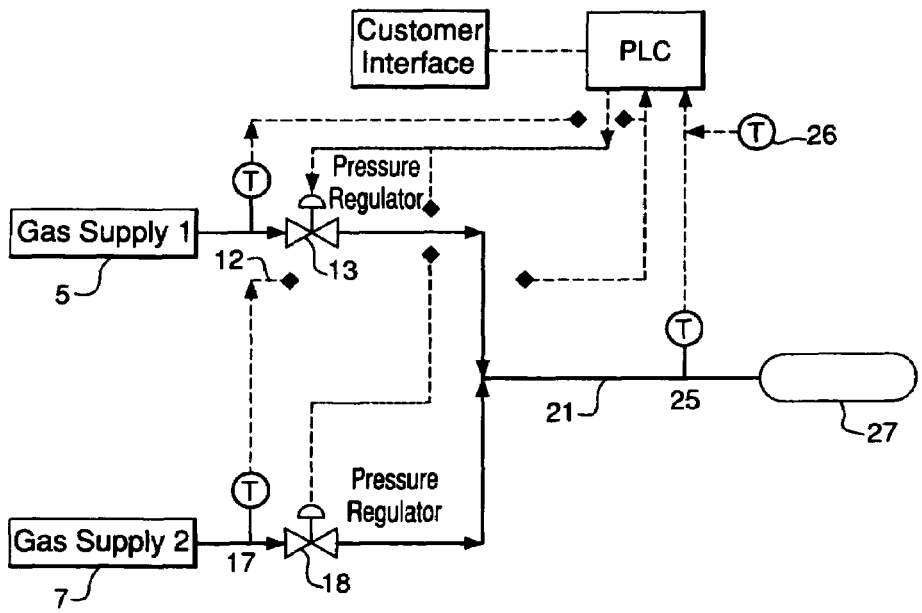
FIG. 2 is a process flow diagram for another embodiment of the instant invention in which two compressed gas streams are blended and delivered to a receiving vessel.

FIG. 2 illustrates another process flow diagram for a purely illustrative compressed gas delivery system 1 that can be used in the invention.

In the process illustrated in FIG. 2, compressed gases 5 and 7 have essentially the same composition and the same or different temperature. The programmable logic controller is in communication with temperature sensor 25 for the receipt and analysis of data representing the temperature of blend 21. Temperature sensor 26 measures the ambient temperature at the receiving tank 27. A desired ramp rate is either inputted at the customer interface or included in the programming for the PLC; the PLC calculates a measured blend ramp rate based on the temperature of blend 21. Programmable logic controller compares the measured blend ramp rate to the desired ramp value from compressed gas streams 5 and 7. Programmable logic controller is in communication with and adjusts pressure regulator 13 as necessary to maintain the blend ramp rate of stream 21 at the pre-set blend ramp rate. The blend ramp rate of stream 21 is determined by the maximum temperature of receiving vessel 27.

The invention is illustrated further in the following non-limiting examples.

EXAMPLE 1

Figure 3:
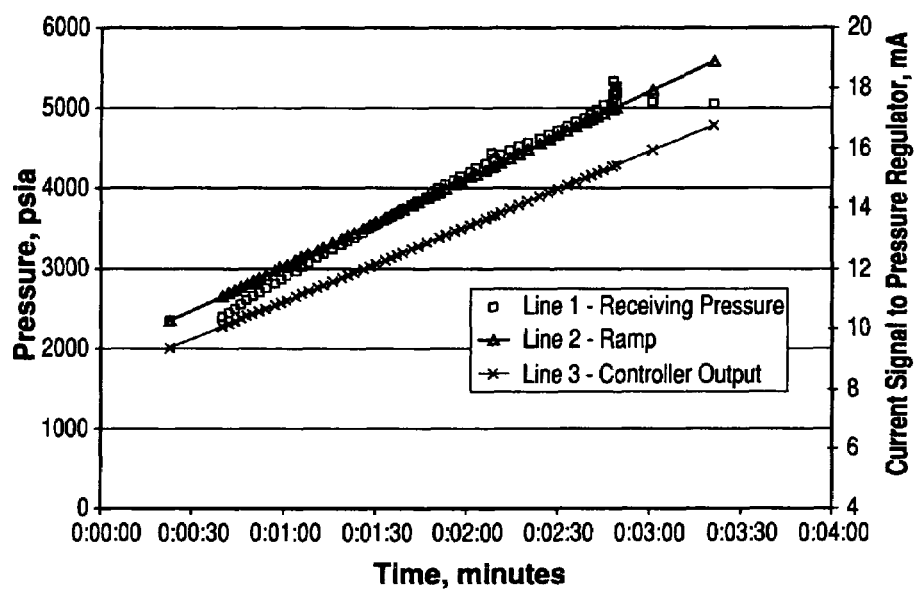
FIG. 3 illustrates variations in (a) pressure, and (b) current signals to pressure regulator versus time (i) for an actual fill of a receiving vessel by a single compressed hydrogen stream in a process configured as in FIG. 1; and (ii) at a ramp rate of 5 MPa per minute.

FIG. 3 illustrates data from an actual fill of a receiving vessel by a single compressed hydrogen stream in accordance with a process that was configured as shown in FIG. 1 and in which only gas from Gas Supply 1 of FIG. 1 was fed to receiving vessel 27. The ramp rate of Gas Supply 1 was 5 MPa per minute. The actual rise in pressure in the receiving vessel (Line 1 of FIG. 3) tracks closely with the desired ramp rate (Line 2 of FIG. 3). Due to the system dynamics, the value of pressure at any time can be either less than (in FIG. 3, at times less than about 1.5 minutes) or greater than (in FIG. 3, at times greater than 2 minutes) the desired ramp rate. The output from the controller to the pressure regulator (Line 3 of FIG. 3) continues to increase over the filling process due to the decrease in pressure driving force between the supply pressure (between 5,000 and 6,000 psia) and the pressure in the receiving vessel. Adjustments are made by the controller (in this case, a programmable logic controller) to the desired output to the pressure regulator 13 in FIG. 1 to control the rate of pressure rise in the receiving vessel.

EXAMPLE 2

A process configured in accordance with FIG. 1, in which a receiving vessel was filled with a blend of compressed natural gas (CNG) and hydrogen, was modeled using both the National Institute of Standards thermodynamic data base of pure fluids (NIST Standard Reference Database 23) and the data illustrated in FIG. 3. The model assumed that all of the components of FIG. 1 were used except for restrictive orifice plates 15 and 20.

Figure 4:
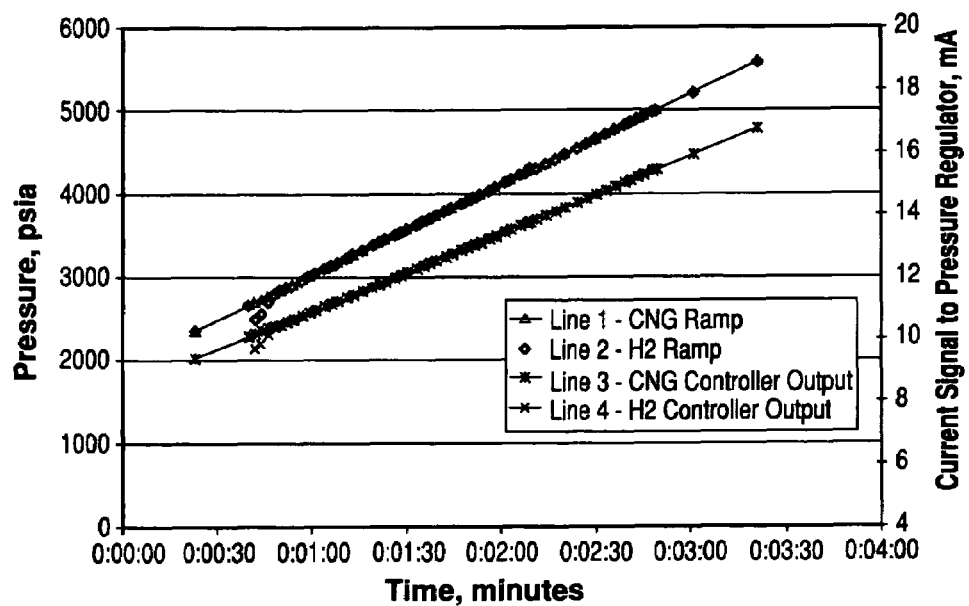
FIG. 4 illustrates variations in (a) pressure, and (b) current signals to pressure regulator versus time for a fill of a receiving vessel by a blend of compressed hydrogen and CNG streams (i) in a process configured as in FIG. 1; and (ii) at a mass ratio of hydrogen to CNG in the receiving vessel of 6%.

FIG. 4 shows the calculated response of a system at ramp rates that achieve a mass ratio of hydrogen to CNG in the receiving vessel of 6%.

Figure 5:
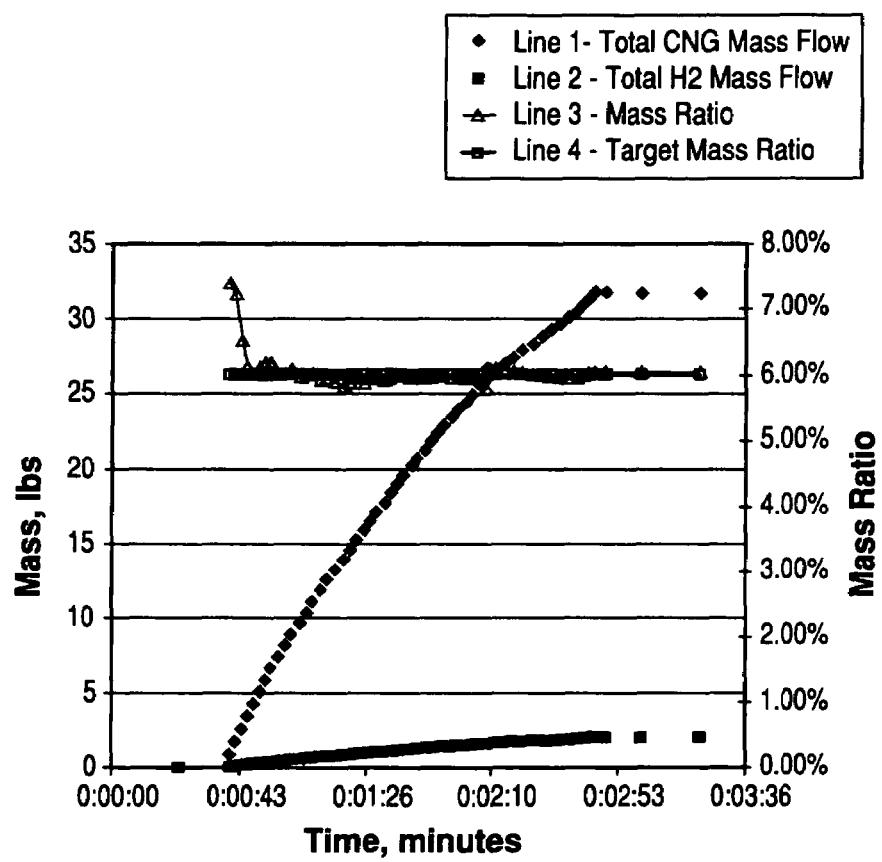
FIG. 5 illustrates (a) estimated cumulative quantities (in units of mass) for both CNG and hydrogen compressed gas streams over fill time, (b) estimated mass ratio of hydrogen over time during the filling process, and (c) the desired mass ratio of hydrogen for a fill of a receiving vessel by a blend of compressed hydrogen and CNG streams in a process configured as in FIG. 1.

FIG. 5 illustrates estimated cumulative quantities (in units of mass) for both CNG (Line 1 of FIG. 5) and hydrogen (Line 2 of FIG. 5) over the fill time, the estimated mass ratio of hydrogen at any time during the filling process (Line 3 of FIG. 5), and the desired mass ratio of hydrogen (Line 4 of FIG. 5). The output from the controller to the two pressure regulators (Line 3 for $H_2$ and Line 4 for CNG in FIG. 4) continues to increase over the filling process due to the decrease in pressure driving force between the supply pressure (between 5,000 and 6,000 psia for both compressed gas streams) and the pressure in the receiving vessel. Adjustments are made by the controller (in this case, a programmable logic controller) to the desired output to the pressure regulators (13 and 18 in FIG. 1) to control the rate of pressure rise in the receiving vessel.

The estimated response of the novel fill process is also depicted in FIG. 5, which illustrates the response of a system in which the mass ratio of hydrogen exceeds the target mass ratio at the beginning of the fill process; the estimated response of the controller (in this example, a programmable logic controller) makes the adjustments to the output to the pressure regulators to achieve the desired mass ratio (in this example, 6%).

EXAMPLE 3

A process configured in accordance with FIG. 1 in which a receiving vessel was filled with a blend of two hydrogen streams having different temperatures was modeled using NIST Standard Reference Database 23 and the data illustrated in FIG. 3. The model assumed that all of the components of FIG. 1 were used and that the temperatures of the two hydrogen streams were 70° F. and −40° F., respectively.

Figure 6:
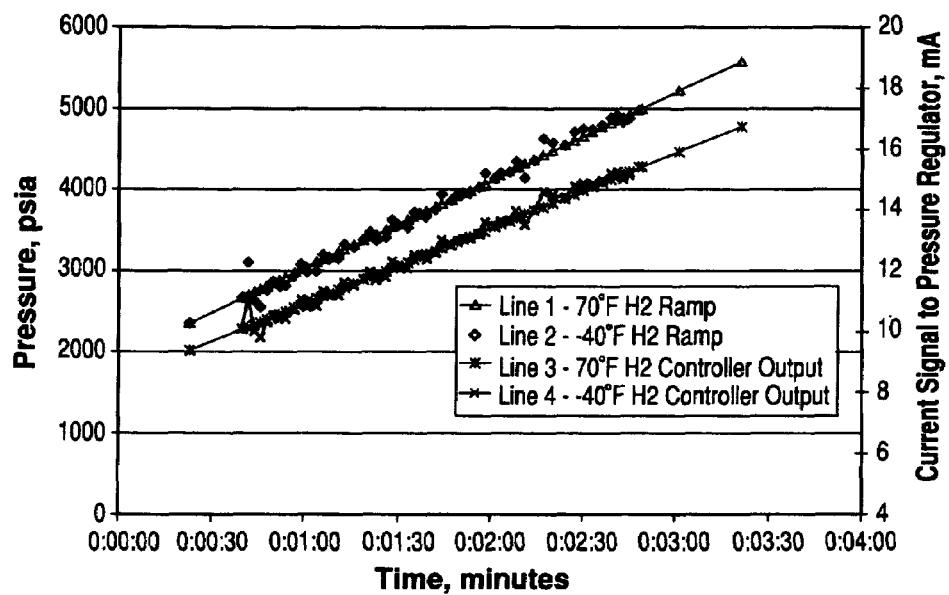
FIG. 6 illustrates variations in (a) pressure, and (b) current signals to pressure regulator versus time for a fill of a receiving vessel by a blend of compressed hydrogen streams of differing temperatures (i) in a process configured as in FIG. 1, and (ii) under conditions which achieved a desired temperature in the receiving vessel of 30° F.

FIG. 6 illustrates the variation of ramp rate and temperature under conditions which achieve a desired temperature in the receiving vessel of 30° F.

Figure 7:
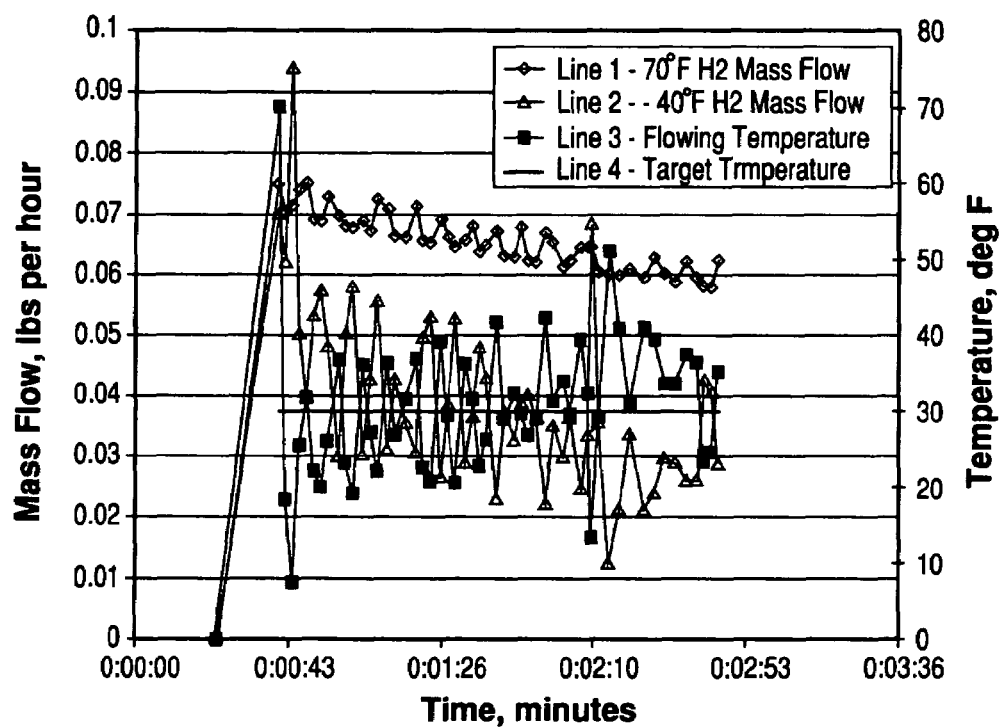
FIG. 7 illustrates variations in (a) mass flow, and (b) temperature versus time for a fill of a receiving vessel by a blend of compressed hydrogen streams of differing temperatures (i) in a process configured as in FIG. 1, and (ii) at a ramp rate of 5 MPa per minute.

FIG. 7 illustrates estimated instantaneous quantities for both warm hydrogen (Line 1 of FIG. 7) and cold hydrogen (Line 2 of FIG. 7) over the fill time, the calculated temperature of hydrogen in the receiving vessel at any time during the filling process (Line 3 of FIG. 7), and the desired temperature of hydrogen (Line 4 of FIG. 7). The output from the controller to the two pressure regulators (Line 3 for warm hydrogen and Line 4 for cold hydrogen in FIG. 6) continues to increase over the filling process due to the decrease in pressure driving force between the supply pressure (between 5,000 and 6,000 psia for both compressed gas streams) and the pressure in the receiving vessel.

Adjustments are made by the controller (in this case, a programmable logic controller) to the desired output to the pressure regulators (13 and 18 in FIG. 2) to control the rate of pressure rise in the receiving vessel. The estimated response of the novel fill process is also depicted in FIG. 7, where the temperature of hydrogen in the receiving vessel exceeds the target temperature at the beginning of the fill process; the estimated response of the controller (in this example, a programmable logic controller) makes the adjustments to the output to the pressure regulators to achieve the desired temperature (in this example, 30° F.).

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A process for delivering a blend of two or more compressed gas streams to a receiving vessel, the process comprising:
   (a) blending two or more compressed gas streams to form the blend, wherein each of the two or more compressed gas streams (1) is supplied by a separate compressed gas supply source, (2) is under the control of one or more pressure regulators, and (3) is subject to mass flow rate measurement by one or more flow detectors; and
   (b) delivering the blend to the receiving vessel at a preset blend ramp rate, wherein
   (I) a programmable controller (1) receives data from the one or more flow detectors representing the mass flow rates for at least two of the two or more compressed gas streams (2) calculates a cumulative mass ratio for the blend based on the mass flow rates of at least two of the two or more compressed gas streams, and (3) (i) compares the calculated cumulative mass ratio for the blend to a pre-set blend cumulative mass ratio, and (ii) adjusts the pressure regulator for at least one of the two or more compressed gas streams as necessary to maintain the calculated cumulative mass ratio for the blend within a specified tolerance of the pre-set blend cumulative mass ratio; and (II) at least two of the two or more compressed gas streams have different compositions.

2. A process of claim 1, wherein the programmable controller is a programmable logic controller.

3. A process of claim 1, wherein the pressure regulator for at least one of the two or more compressed gas streams includes a current to pressure transducer.

4. A process of claim 1, wherein:
   (a) a blend of hydrogen and compressed natural gas is delivered to the receiving vessel;
   (b) the mass percentage of hydrogen in the blend ranges from about 0.6 to about 11% and the balance of blend consists essentially of compressed natural gas; and
   (c) the maximum receiving vessel pressure is around 25 MPa to around 35 MPa.

5. A process of claim 4, wherein during delivery of the blend to the receiving vessel, the receiving vessel temperature does not exceed around 85° C.

6. A process of claim 1, wherein the pre-blending temperatures of the two or more compressed gas streams are approximately the same.

7. A process of claim 1, wherein the pre-blending temperature of one of the two or more compressed gas streams is approximately ambient temperature.

8. A process of claim 4, wherein the receiving vessel is located at a compressed gas station for fueling vehicles.

9. A process of claim 4, wherein the preset blend ramp rate is between around 5 to around 15 MPa per minute.

10. A process for delivering a blend of two or more compressed gases to a receiving vessel, the process comprising:
   (a) blending two or more compressed gas streams to form the blend, wherein each of the two or more compressed gas streams (1) is supplied by a separate compressed gas supply source, (2) is under the control of one or more pressure regulators, (3) is subject to temperature measurement by one or more temperature sensors, (4) has essentially the same composition; and
   (b) delivering the blend to the receiving vessel at a preset blend ramp rate, wherein
   a programmable controller (1) receives data from the one or more temperature sensors representing the temperatures of at least two of the two or more compressed gas streams (2) calculates an instantaneous ramp rate for at least one of the compressed gas streams based on the temperatures of at least two of the two or more compressed gas streams, and (3) (i) compares an instantaneous measured temperature of the blend to a pre-set target temperature of the blend, and (ii) adjusts the pressure regulator for at least one of the two or more compressed gas streams as necessary to maintain the instantaneous measured temperature within a specified tolerance.

11. A process of claim 10, wherein the programmable controller is a programmable logic controller.

12. A process of claim 10, wherein the pressure regulator for at least one of the two or more compressed gas streams includes a current to pressure transducer.

13. A process of claim 10, wherein the two or more compressed gas streams consist of two or more hydrogen streams or two or more compressed natural gas streams.

14. A process of claim 13, wherein during delivery of the blend to the receiving vessel, the receiving vessel temperature does not exceed around 85° C.

15. A process of claim 10, wherein the pre-blending temperatures of the two or more compressed gas streams are different.

16. A process of claim 10, wherein the pre-blending temperature of one of the two or more compressed gas streams is approximately ambient temperature.

17. A process of claim 13, wherein the receiving vessel is located at a compressed gas station for fueling vehicles.

18. A process of claim 13, wherein the preset blend ramp rate is around 5 to around 15 MPa per minute.

19. A process of claim 4, wherein the calculated cumulative mass ratio for the blend is maintained at a value of between around 0.1% to around 10% of the pre-set blend cumulative mass ratio.

20. A process of claim 13, wherein the blended temperature is maintained at a value of between around 0° C. to around 20° C. of the desired temperature.

* * * * *